United States Patent [19]

McCartney

[11] Patent Number: 4,601,961
[45] Date of Patent: Jul. 22, 1986

[54] BILAMINAR SEAWATER BATTERY

[75] Inventor: Joseph F. McCartney, Virginia Beach, Va.

[73] Assignee: The United States of America as represented by the Secretary of the Navy, Washington, D.C.

[21] Appl. No.: 795,032

[22] Filed: Nov. 4, 1985

[51] Int. Cl.$^4$ .............................. H01M 6/34
[52] U.S. Cl. .................... 429/119; 429/127
[58] Field of Search ................. 429/119, 127

[56] References Cited

U.S. PATENT DOCUMENTS

| | | | |
|---|---|---|---|
| 1,522,121 | 1/1925 | Harrison | 429/119 |
| 2,590,584 | 3/1952 | Taylor | 136/103 |
| 2,669,596 | 2/1954 | Nelson | 429/119 |
| 3,481,790 | 12/1969 | Duddy | 136/100 |
| 3,966,497 | 6/1976 | Honer | 136/90 |
| 4,076,904 | 2/1978 | Chen | 429/119 |
| 4,192,913 | 3/1980 | Koontz et al. | 429/119 |
| 4,278,743 | 7/1981 | Thompson | 429/119 |
| 4,522,897 | 6/1985 | Walsh | 429/119 |

Primary Examiner—Donald L. Walton
Attorney, Agent, or Firm—Robert F. Beers; Ervin F. Johnston

[57] ABSTRACT

A seawater battery has been provided which includes an anode and a cathode, the anode being a flexible sheet of anode material and the cathode being a flexible foil of cathode material. An insulative flexible film joins one side of the cathode foil to one side of the anode sheet so as to form a flexible bilaminar composite. A device is operatively associated with the bilaminar composite for providing it positive buoyancy in seawater, and a ballast device is connected to a bottom edge of the bilaminar composite. An electrical lead is connected to the anode sheet and an electrical lead is connected to the cathode foil at a common edge of the bilaminar composite and in close proximity to one another. The bilaminar composite is flexed to a compacted condition, and a device is provided for releaseably retaining the bilaminar composite in the compacted flexed condition. With this arrangement the battery can be placed in seawater and when the retaining device is released the bilaminar composite will unflex and electrical current will be produced across the electrical leads.

17 Claims, 21 Drawing Figures

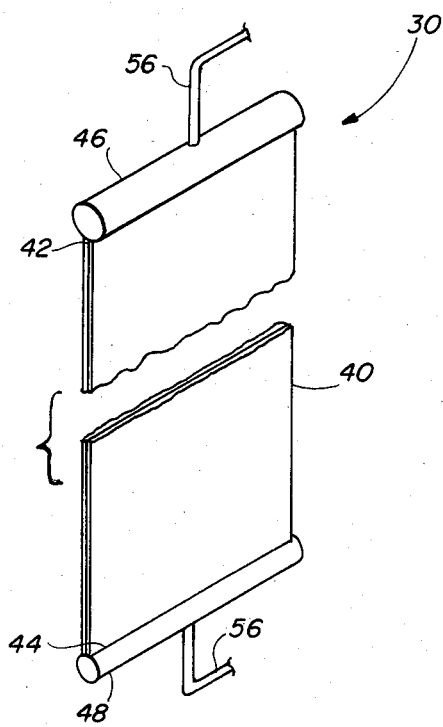
FIG. 5
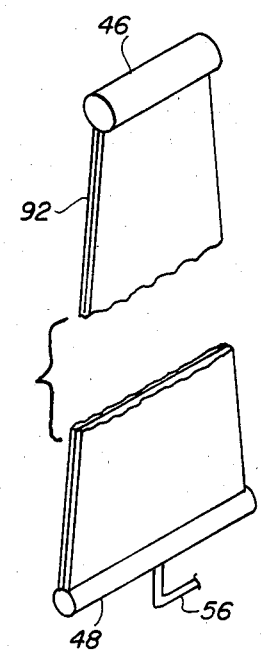
FIG. 6
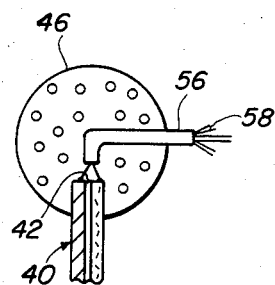
FIG. 7
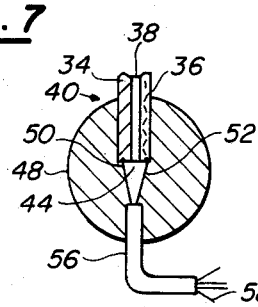
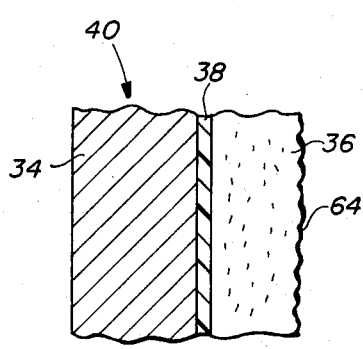
FIG. 8
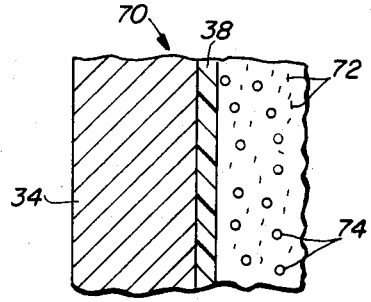
FIG. 9    FIG. 10

BILAMINAR SEAWATER BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a battery of the type which operates in seawater where there is some current.

The Navy has many at-sea devices which require electrical power. Exemplary devices are ocean sensors (temperature, salinity, etc.), undersea search vehicles, underwater weapons and countermeasures, and fiber optic cable systems. A power package for any of these devices should be compact, low-cost, lightweight, and safe. The Navy has developed lithium batteries for some of these devices, however, the lithium battery is costly and can explode when shorts occur. Other types of batteries, such as carbon zinc dry cells, lead acid cells, and silver zinc cells do not have sufficient energy density for most Navy devices. Many of the prior art batteries also suffere from being depth sensitive and/or having a short term power capability.

SUMMARY OF THE INVENTION

The present invention provides a high energy density, safe, low-cost, deep ocean power source for low power, long endurance applications which overcomes the problems associated with prior art batteries utilized to power ocean devices. This has been accomplished by providing a seawater battery which includes an anode and a cathode, the anode being a flexible sheet of anode material and the cathode being a flexible foil of cathode material. An insulative flexible film joins one side of the cathode foil to one side of the anode sheet so as to form a flexible bilaminar composite. A device is operatively associated with the bilaminar composite for providing it positive buoyancy in seawater, and a ballast device is connected to a bottom edge of the bilaminar composite. An electrical lead is connected to the anode sheet and an electrical lead is connected to the cathode foil at a common edge of the bilaminar composite and in close proximity to one another. The bilaminar composite is flexed to a compacted condition, and a device is provided for releaseably retaining the bilaminar composite in the compacted flexed condition. With this arrangement the battery can be placed in seawater and when the retaining device is released the bilaminar composite will unflex and electrical current will be produced across the electrical leads.

OBJECTS OF THE INVENTION

An object of the present invention is to overcome the problems associated with prior art batteries utilized to power devices utilized in the ocean.

Another object is to provide a high energy density and safe seawater battery which can be utilized for providing power over a long period of time.

A further object is to provide a pressure insensitive high energy density seawater battery which does not suffer from the explosion problem of lithium batteries.

Still another object is to provide a high energy density safe low-cost pressure insensitive seawater battery which has long shelf life and which will be capable of providing power over a long period of time.

These and other objects of the invention will become more readily apparent from the ensuing specification when taken together with the drawings.

BRIEF DESCRIPTION OF THE DRAWINGS

FIG. 5 is an isometric schematic illustration of top and bottom portions of one embodiment of the bilaminar seawater battery.

FIG. 6 is similar to FIG. 5 except the bilaminar seawater battery is tapered from its bottom edge to its top edge.

FIG. 7 illustrates cross-sectional side views of exemplary top and bottom portions of the bilaminar seawater battery with the bilaminar composite enlarged to show optional details thereof.

FIG. 8 is an enlarged cross-sectional view through one embodiment of the bilaminar composite of the seawater battery.

FIG. 9 is an enlarged cross-sectional side view of another embodiment of the bilaminar composite of the seawater battery.

FIG. 10 is a cross-sectional enlarged side view of still another embodiment of the bilaminar composite of the seawater battery.

DESCRIPTION OF THE PREFERRED EMBODIMENTS

Figure 1:
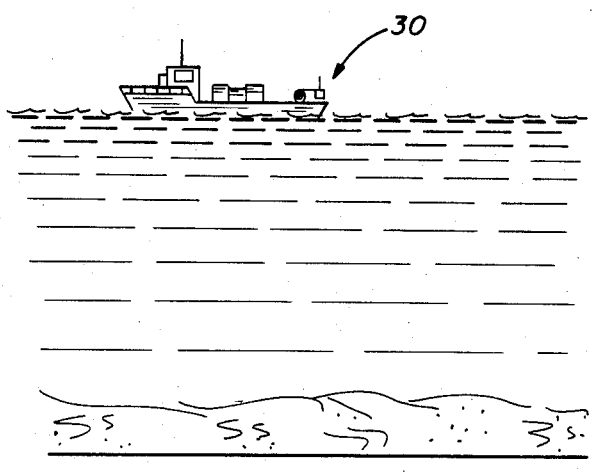
FIG. 1 is an ocean elevation view with a ship transporting a bilaminar seawater battery.
Figure 2:
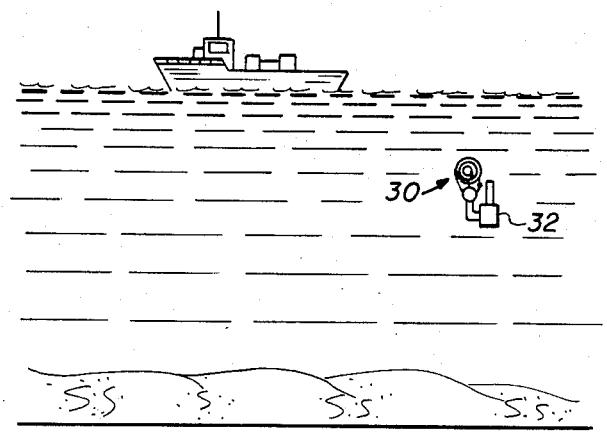
FIG. 2 is similar to FIG. 1 except the bilaminar seawater battery has been heaved into the ocean where it is midway between the surface and the ocean bottom.
Figure 3:
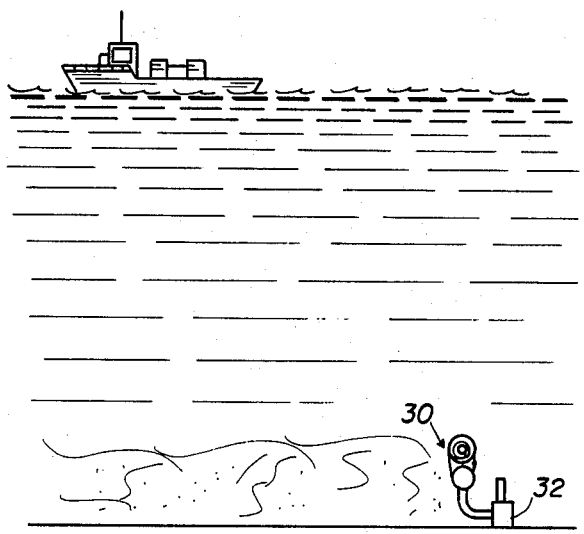
FIG. 3 is similar to the previous figures except the bilaminar seawater battery has come to rest on the ocean bottom.
Figure 4:
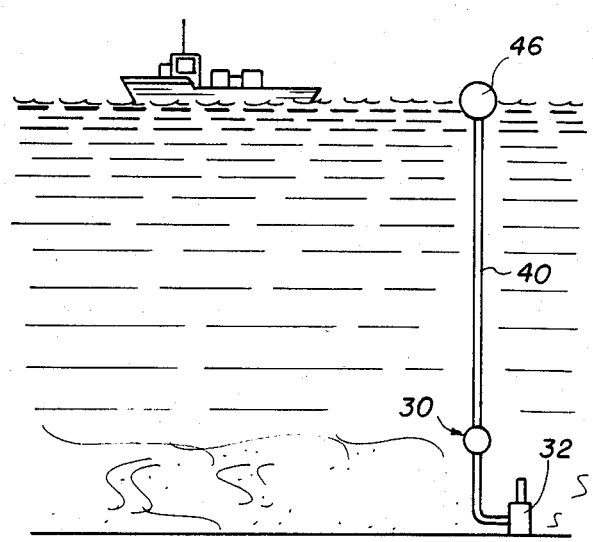
FIG. 4 is similar to the previous figures except the bilaminar seawater battery has been extended to become operational for producing electrical current.

Referring now to the drawings wherein like reference numerals designate like or similar parts throughout the several views there is illustrated in FIG. 1 a ship transporting a bilaminar seawater battery 30. In FIG. 2 the seawater battery 30 has been deployed and is descending in the ocean. FIG. 3 illustrates the seawater battery resting on the bottom of the ocean, and FIG. 4 illustrates the seawater battery uncoiled and fully operational for operating equipment, such as oceanographic instrumentation 32. FIGS. 5, 7, 8, 11, 12 and 13 illustrate details of the bilaminar seawater battery 30 shown in FIGS. 1-4. This embodiment of the bilaminar seawater battery includes an anode 34 which may be a flexible sheet of anode material, such as a sheet of magnesium. The seawater battery 30 includes a cathode 36 which may be a flexible foil of cathode material such as epoxy filled with carbon particles. An insulative flexible film 38 joins one side of the cathode foil 36 to one side of the anode sheet 34 so as to form a flexible bilaminar composite 40. As illustrated in FIG. 5, the bilaminar composite 40 has top and bottom edges 42 and 44, respectively.

Figure 13:
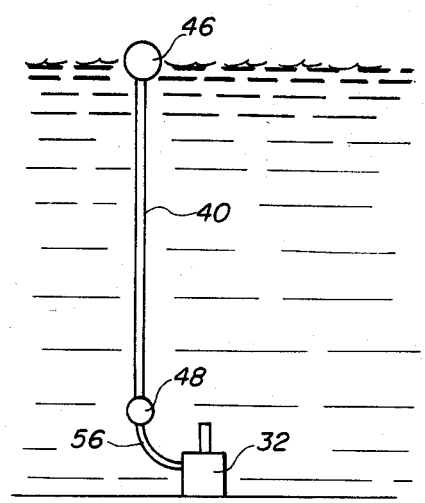

Means are operatively associated with the bilaminar composite 40 for providing positive buoyancy to the bilaminar composite in seawater. In the embodiment of the bilaminar seawater battery 30 this buoyancy means may be a cylindrical float 46 (see FIGS. 5 and 7) which is connected along the top edge 42 of the bilaminar composite 40. A ballast means, such as a metal cylinder 48, may be connected to the bottom edge 44 of the bilaminar composite 40. In the embodiment 30 of the bilaminar seawater battery the buoyancy means 46 may provide positive battery buoyancy to the combined bilaminar composite 40 and the ballast means 48, as illustrated in FIG. 13.

As illustrated in FIG. 7 an electrical lead 50 is connected to the anode sheet 34 and an electrical lead 52 is connected to the cathode foil 36 at a common edge, such as the bottom edge 44 or the top edge 42 of the bilaminar composite 40 with the leads 50 and 52 in close proximity to one another. Leads 50 and 52 are combined together in a cable 56 which has strength wires 58 in its sheathing. While top and bottom cables 56 are provided for the seawater battery, normally only one of these cables is utilized and the other is sealed off depending upon whether electrical load is to be delivered at the top or bottom of the battery. FIGS. 5 and 7 illustrate that the cable 56 can exit the top, bottom, or from the side of the float 46 or ballast means 48.

Figure 11:
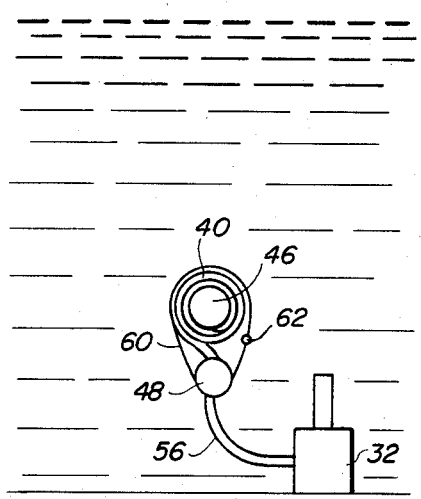
FIGS. 11, 12 and 13 are schematic illustrations of one embodiment of the bilaminar seawater battery in various stages, FIG. 11 illustrating the bilaminar composite being retained in its coiled position, FIG. 12 illustrating the bilaminar composite partially uncoiled, and FIG. 13 illustrating the bilaminar composite being fully uncoiled in its operational condition.
Figure 12:
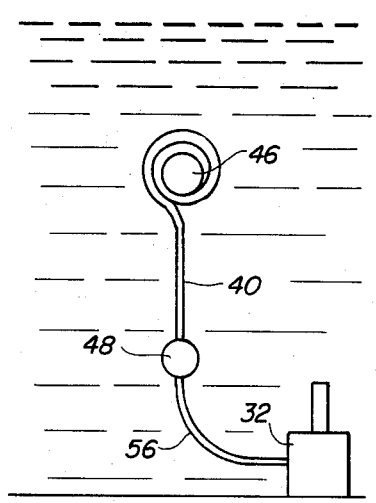

The bilaminar composite 40 is flexed to a compacted condition prior to deployment, and means are provided for releasably retaining the bilaminar composite in the compacted flexed condition. In the embodiment 30 of the bilaminar seawater battery the bilaminar composite 40 is rolled into the compacted flexed condition, as illustrated in FIG. 11. An exemplary releasable retaining means may include a lanyard 60 wrapped around the rolled bilaminar composite 40 with its bitter ends held together by a dissolvable retainer ring 62, such as a ring made of salt or sugar. When the ring 62 dissolves and the lanyard 60 is released from the rolled bilaminar composite, the float 46 causes the bilaminar composite 40 to unroll, which unrolling is illustrated in FIG. 12. When the bilaminar composite 40 is completely unrolled the length of the latter is designed so that the float 46 is in the proximity of the surface of the ocean, at which time the bilaminar seawater battery is fully operational. In the embodiment 30 the bottom cable 56 is utilized for delivering power to the oceanographic instrumentation 32 on the bottom of the ocean. Power is delivered because there is an ionic flow between the cathode and the anode through the seawater electrolyte. This generates electricity along the full length of the bilaminar composite and is collected at the bottom thereof for delivery to the oceanographic instrumentation 32. As illustrated in FIG. 7, the top and bottom edges 42 and 44 of the bilaminar composite 40, the leads 50 and 52, and the cable 56 may be fixed in their relationship to one another by bonding these components within the float 46 and the ballast 48. These components may be fixed in place within the float 46 and the ballast 48 by epoxy.

Figure 20:
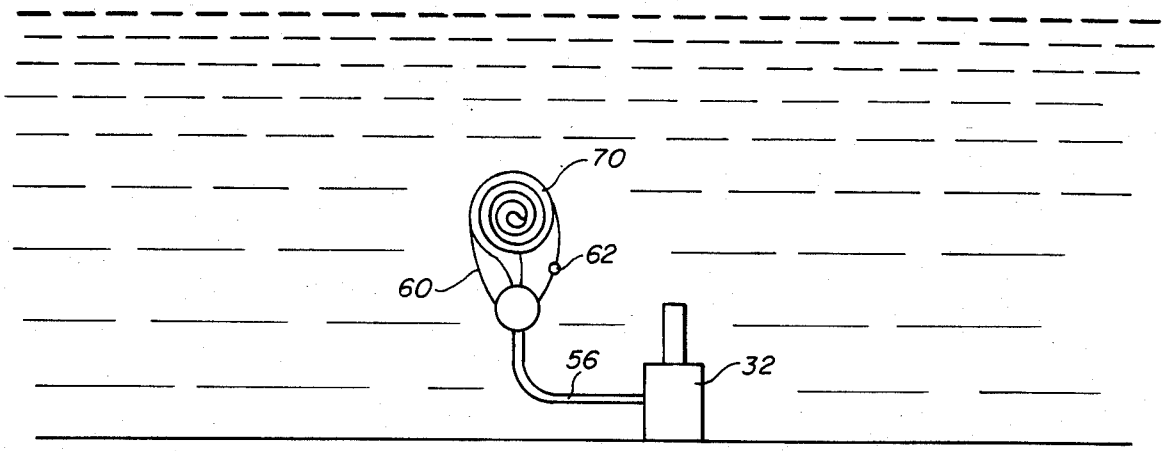
FIGS. 20 and 21 illustrate yet another embodiment of the invention in various stages of deployment, FIG. 20 illustrating the battery in a coiled condition and FIG. 21 illustrating the battery in an uncoiled operational condition.
Figure 21:
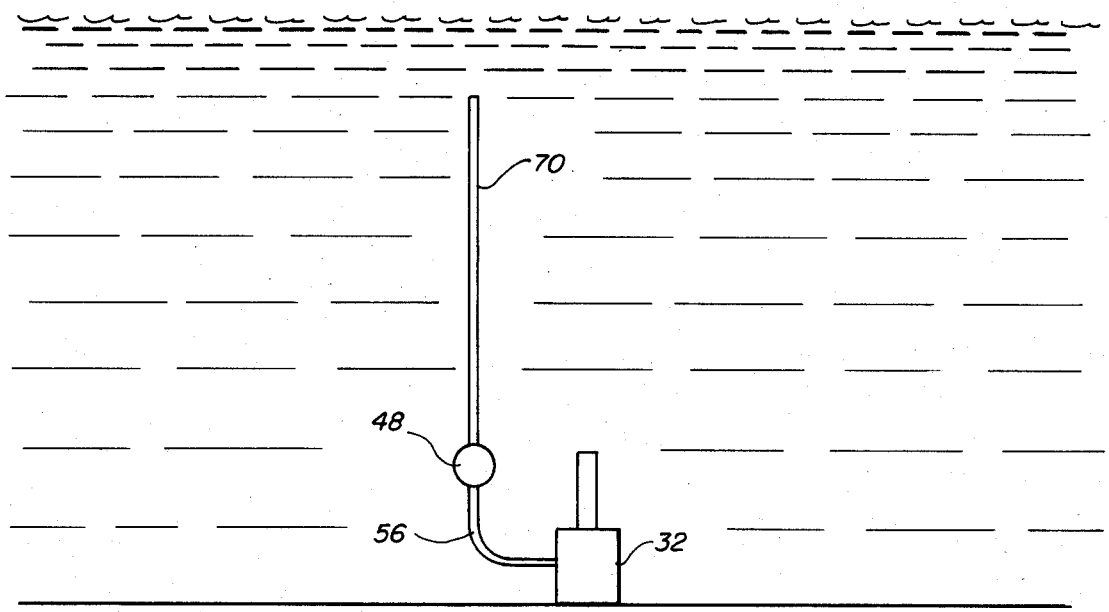

It is desirable that the cathode foil 36 have a roughened exterior surface 64 as illustrated in FIG. 8. This roughened surface will minimize laminar seawater flow thereacross so as to prevent formation of carbonate deposits which would impede the flow of ions. Another embodiment of the bilaminar composite 66 is illustrated in FIG. 10 which is similar to the FIG. 8 embodiment except the cathode foil is a wire screen 68, such as a copper wire screen. This embodiment is especially effective since the wire screen provides a roughened surface to prevent laminar seawater flow and thus minimizes the deposits of various carbonates. FIG. 9 is still another embodiment 70 of the bilaminar composite which is similar to the previous embodiments except the cathode foil 72 is an epoxy which not only contains carbon particles but also contains voids 74, which epoxy containing voids is termed "syntatic foam". With sufficient voids 74 the float 46 of the battery embodiment 30 may be eliminated. Sufficient voids 74 may be established by mixing glass microspheres in the epoxy so as to make the bilaminar composite 70 and the ballast means 44 buoyant in water as illustrated in the FIGS. 20 and 21 embodiment of the invention. When the lanyard 60 of this embodiment is released the bilaminar composite 70 simply unrolls on its own accord to assume the fully extended operational condition, as illustrated in FIG. 21.

Figure 14:
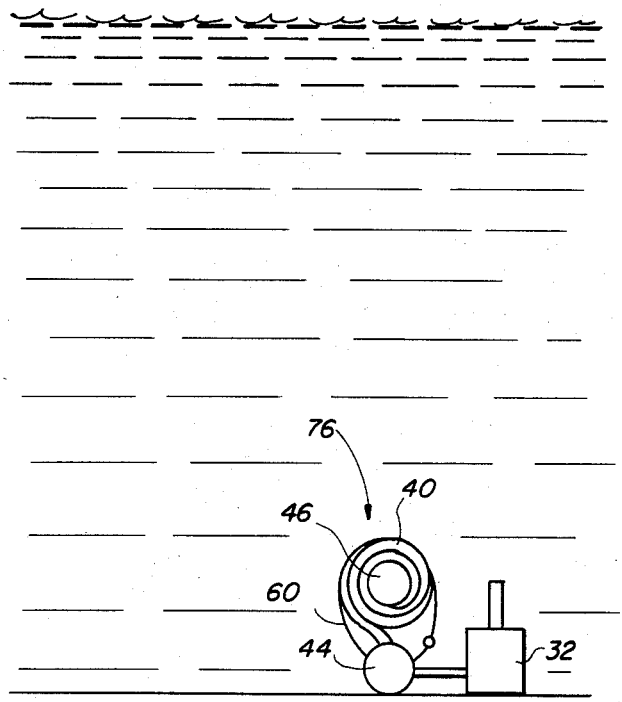
FIGS. 14 and 15 are schematic illustrations of another embodiment of the bilaminar seawater battery in various stages, FIG. 14 illustrating the battery in a retained condition and FIG. 15 illustrating the battery in a fully extended operational condition.
Figure 15:
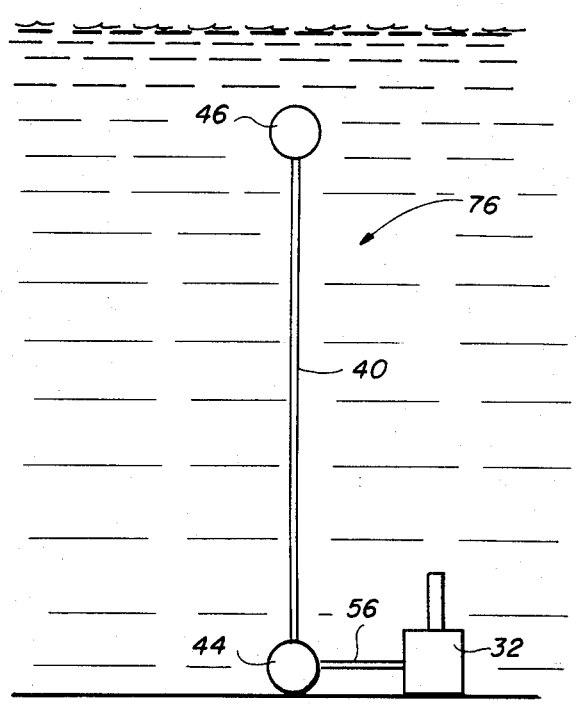

FIGS. 14 and 15 illustrate another embodiment 76 of the bilaminar seawater battery wherein the ballast means 44 provides negative buoyancy to the combined bilaminar composite 40 and the buoyancy means 46. FIG. 14 illustrates the bilaminar composite in the coiled condition. When the lanyard 60 is released the bilaminar composite 40 will assume the upright fully extended operational condition, as illustrated in FIG. 15. In the operational condition of this embodiment the float 46 is located below the surface of the water where there is less wave action. Accordingly, this embodiment is desirable in areas where surface wave action would be detrimental to the operation of the seawater battery.

Figure 16:
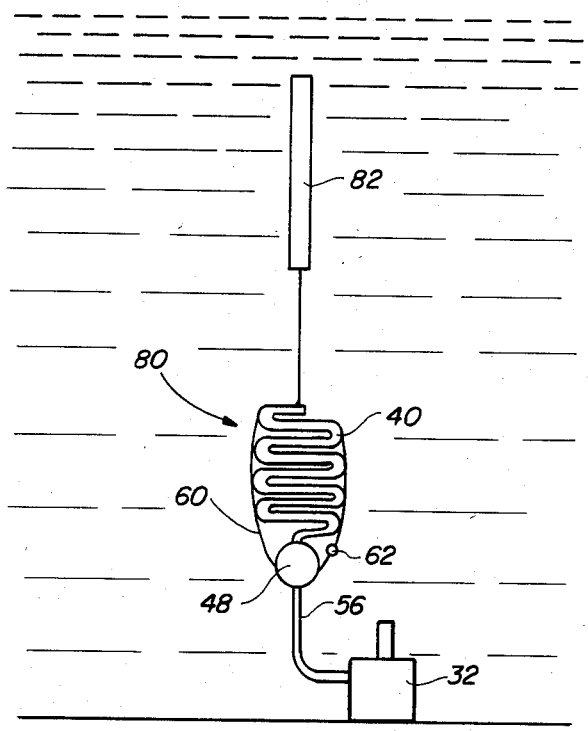
FIGS. 16 and 17 illustrate a further embodiment of the invention in various stages of deployment, FIG. 16 illustrating the bilaminar seawater battery in a retained folded condition and FIG. 17 illustrating the battery in a fully extended operational condition.
Figure 17:
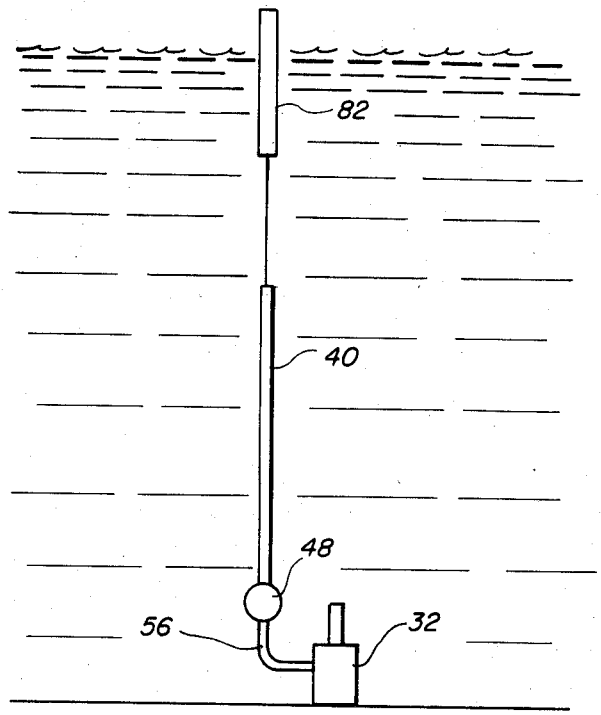

Another embodiment 80 of the bilaminar seawater battery is illustrated in FIGS. 16 and 17. In this embodiment the bilaminar composite 40 is folded into the compacted flexed condition rather than being rolled. The lanyard 60 holds the bilaminar composite 40 in the folded condition and upon being released by the connector 62 the bilaminar composite if fully extended to its operational condition, as illustrated in FIG. 17. Also, in this embodiment the buoyancy means is a spar buoy 82 rather than a cylindrical float 46 with the spar buoy providing positive buoyancy to the bilaminar composite 40 and the ballast means 48.

Figure 18:
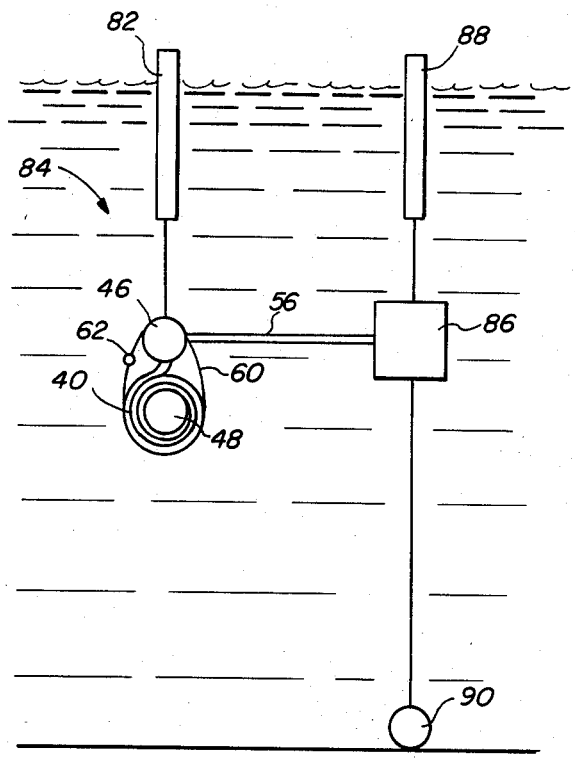
FIGS. 18 and 19 are still another embodiment of the invention in various stages of deployment, FIG. 18 illustrating the seawater battery in a retained coiled condition and FIG. 19 illustrating the battery in an uncoiled operational condition.
Figure 19:
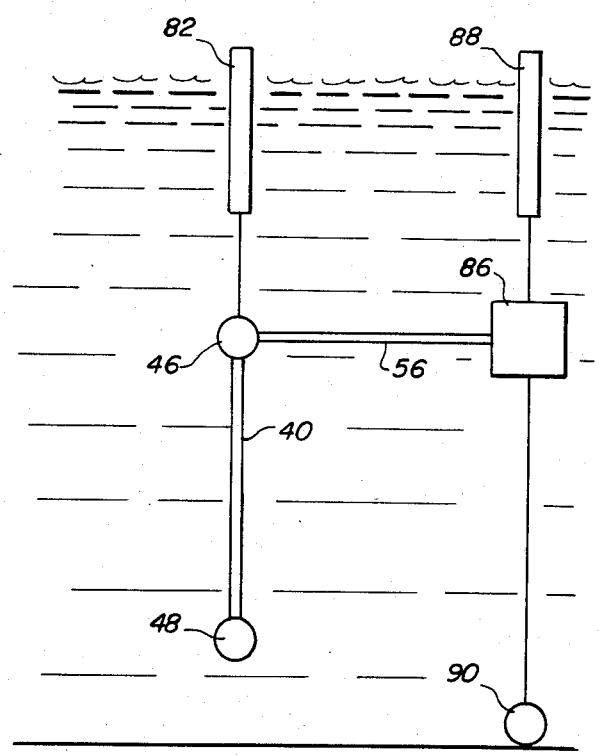

FIGS. 18 and 19 illustrate a further embodiment 84 of the bilaminar seawater battery which is similar to the embodiment illustrated in FIGS. 16 and 17 except power is taken from the top of the bilaminar seawater battery to power oceanographic instrumentation 86 is suspended in the ocean between a spar buoy 88 and an anchor 90. A further difference is that the bilaminar composite 40 is rolled instead of folded. Again, when the bilaminar composite unrolls it assumes the condition as illustrated in FIG. 19.

In all of the embodiments it may be desirable to provide a bilaminar composite 92 which has a tapered configuration from one edge to the other edge depending upon whether power is taken from the top or the bottom of the seawater battery. If power is taken from the bottom the bilaminar composite should be tapered from its bottom edge to its top edge, however if power is taken from the top the bilaminar composite should be tapered from its top edge to its bottom edge. The reason for this is that ionic exchange occurs all along the bilaminar composite and builds up along the bilaminar composite to the leads where the electrical current is tapped. Accordingly, more current progressively flows through the bilaminar composite to the leads as the ionic exchange builds up from the opposite edge to the edge where the leads are located.

Obviously many modifications and variations of the present invention are possible in the light of the above teachings. It is therefore to be understood that within the scope of the appended claims the invention may be practiced otherwise than as specifically described.

What is claimed is:

1. A bilaminar seawater battery comprising:
an anode including a flexible sheet of anode material;
a cathode including a flexible foil of cathode material;
an insulative flexible film joining one side of the cathode foil to one side of the anode sheet so as to form a flexible bilaminar composite;
the bilaminar composite having top and bottom edges;
means operatively associated with the bilaminar composite for providing positive buoyancy to the bilaminar composite in seawater;
ballast means connected to the bottom edge of the bilaminar composite;
an electrical lead connected to the anode sheet and an electrical lead connected to the cathode foil at a common edge of the bilaminar composite and in close proximity to one another;
the bilaminar composite being flexed to a compacted condition; and
means releasably retaining the bilaminar composite in the compacted flexed condition;
whereby upon placing the battery in seawater and releasing the retaining means the bilaminar composite will unflex and electrical current will be produced across the electrical leads.

2. A battery as claimed in claim 1 wherein:
the bilaminar composite is folded into said compacted flexed condition.

3. A battery as claimed in claim 1 wherein:
the buoyancy means includes a spar buoy which is connected to the top edge of the bilaminar composite.

4. A battery as claimed in claim 1 wherein:
the ballast means provides negative buoyancy to the combined bilaminar composite and buoyancy means.

5. A battery as claimed in claim 1 wherein:
the buoyancy means provides positive buoyancy to the combined bilaminar composite and ballast means.

6. A battery as claimed in claim 1 wherein:
the buoyancy means includes a float which is connected to the top edge.

7. A battery as claimed in claim 1 wherein:
the cathode foil is an epoxy containing carbon particles.

8. A battery as claimed in claim 7 wherein:
the buoyancy means includes the epoxy foil containing microballoons.

9. A battery as claimed in claim 1 wherein:
the cathode foil has a roughened exterior surface.

10. A battery as claimed in claim 9 wherein:
the cathode foil is a wire screen.

11. A battery as claimed in claim 10 wherein:
the anode material is magnesium and the cathode material is copper.

12. A battery as claimed in claim 1 wherein:
the bilaminar composite is tapered from its bottom edge to its top edge.

13. A battery as claimed in claim 1 wherein:
the bilaminar composite is rolled into said compacted flexed condition.

14. A battery as claimed in claim 13 wherein:
the buoyancy means includes a float which is connected to the top edge.

15. A battery as claimed in claim 14 wherein:
the cathode foil has a roughened exterior surface.

16. A battery as claimed in claim 15 wherein:
the ballast means provides negative buoyancy to the combined bilaminar composite and buoyancy means.

17. A battery as claimed in claim 15 wherein:
the buoyancy means provides positive buoyancy to the combined bilaminar composite and ballast means.

* * * * *